(12) United States Patent
Chou et al.

(10) Patent No.: US 9,711,933 B1
(45) Date of Patent: Jul. 18, 2017

(54) LASER SYSTEM AND LASER OUTPUTTING METHOD

(71) Applicant: HC PHOTONICS CORP., Hsinchu (TW)

(72) Inventors: Ming-Hsien Chou, Hsinchu (TW); Hung-Wen Chen, Hsinchu (TW); Huang-Yi Lin, Hsinchu (TW); Ting-Hui Chen, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 79 days.

(21) Appl. No.: 15/234,294

(22) Filed: Aug. 11, 2016

(30) Foreign Application Priority Data

Jan. 19, 2016 (TW) .............................. 105101546 A

(51) Int. Cl.
*H01S 3/13* (2006.01)
*H01S 3/11* (2006.01)
*H01S 3/137* (2006.01)

(52) U.S. Cl.
CPC ........... *H01S 3/1115* (2013.01); *H01S 3/1112* (2013.01); *H01S 3/1304* (2013.01); *H01S 3/1305* (2013.01); *H01S 3/137* (2013.01); *H01S 3/1307* (2013.01)

(58) Field of Classification Search
CPC .... H01S 3/1115; H01S 3/1304; H01S 3/1305; H01S 3/1307; H01S 3/137; H01S 3/1112
See application file for complete search history.

(56) References Cited

U.S. PATENT DOCUMENTS

| | | | | |
|---|---|---|---|---|
| 2004/0017833 | A1* | 1/2004 | Cundiff | H01S 3/1112 372/18 |
| 2006/0182153 | A1* | 8/2006 | Liu | H01S 3/067 372/6 |
| 2009/0034564 | A1* | 2/2009 | Lederer | G01J 11/00 372/25 |
| 2012/0263197 | A1* | 10/2012 | Koplow | G02B 6/274 372/6 |
| 2014/0276672 | A1* | 9/2014 | Lee | A61F 9/00825 606/4 |

* cited by examiner

*Primary Examiner* — Kinam Park
(74) *Attorney, Agent, or Firm* — Juan Carlos A. Marquez; Marquez IP Law Office, PLLC

(57) ABSTRACT

A laser system and a laser outputting method are disclosed. The method comprises: providing a oscillator, wherein the oscillator comprises a pump light source, a cavity and a mode locked controller; utilizing the pump light source to emit a pump light into the cavity; outputting first laser pulses to the spectrum converter; utilizing a wavelength conversion chip of the spectrum converter to convert the first laser pulses to second laser pulses; utilizing at least one photodetector to detect a power of the second laser pulses; controlling the mode locked controller to modulate a modelocked status of the cavity when the power of the second laser pulses is lower than a threshold value.

20 Claims, 8 Drawing Sheets

LASER SYSTEM AND LASER OUTPUTTING METHOD

FIELD OF THE INVENTION

The present invention relates to a laser system and a laser outputting method, and more particularly to a laser system and a laser outputting method for actively modulating a mode-locked status thereof.

BACKGROUND OF THE INVENTION

Laser devices or systems have been used to perform many applications, such as detecting, marking, engraving, micro-machining, and cutting. At present, many existing high power pulsed lasers rely on techniques such as Q-switching and mode locking to generate optical pulses.

However, such lasers produce optical pulses with characteristics that are predetermined by the cavity geometry, the mirror reflectivities, and the like and cannot generally be varied in the field without compromising the laser performance. Using such lasers, it is generally difficult to achieve a range of variable pulse characteristics. Therefore, when an internal status (such as the locking mode) of the laser system is varied, it is very difficult to regulate the internal status of the laser system, thereby deteriorating the laser performance.

SUMMARY OF THE INVENTION

An object of the present invention is to provide a laser system comprising an oscillator and a spectrum converter. The oscillator comprises a pump light source; a cavity connected to the pump light source; a mode locked controller disposed in the cavity; and a laser output unit configured to output first laser pulses. The spectrum converter comprising a wavelength conversion chip configured to convert the first laser pulses into second laser pulses; and a photo-detector configured to detect a power of the second laser pulses, wherein, when the power of the second laser pulses is lower than a threshold value, a control signal is transmitted to the mode locked controller, so as to drive the mode locked controller to control a mode-locked status of the cavity of the oscillator.

Another object of the present invention is to provide a laser outputting method comprising: providing an oscillator, wherein the oscillator comprises a pump light source, a cavity and a mode locked controller; utilizing the pump light source to emit a pump light into the cavity; utilizing the oscillator to generate first laser pulses; outputting the first laser pulses to a spectrum converter, wherein the spectrum converter comprises a wavelength conversion chip; utilizing the wavelength conversion chip to convert the first laser pulses to second laser pulses; utilizing at least one photo-detector to detect a power of the second laser pulses; controlling the mode locked controller to modulate a mode-locked status of the cavity when the power of the second laser pulses is lower than a threshold value.

Further one object of the present invention is to provide a laser system comprising an oscillator, a spectrum converter and a control unit. The oscillator comprises: a pump light source; a cavity connected to the pump light source; a mode locked controller disposed in the cavity; two collimators disposed in the cavity; a saturable absorber disposed in the cavity, wherein the two collimators are disposed at both sides of the saturable absorber, and a free space is formed between the two collimators; and a laser output unit configured to output first laser pulses. The spectrum converter comprises: a wavelength conversion chip configured to convert the first laser pulses into second laser pulses; a plurality of filters configured to filter different wavelengths of the second laser pulses, so as to split the second laser pulses for outputting the second laser pulses of multi-wavelengths; and a plurality of photo-detector corresponding to the plurality of filters and configured to detect a power of the second laser pulses. The control unit electrically connected to the mode locked controller, wherein, when the power of the second laser pulses is lower than a threshold value, the control unit transmits a control signal to the mode locked controller, so as to drive the mode locked controller to control a mode-locked status of the cavity of the oscillator.

In various embodiments of the present invention, the laser system can be used to generate laser pulses, such as femto-second laser, pico-second laser, micro-second laser, and the like. A pulse width of the laser pulses generated from the laser system may be in a range of $10^{-15}$ second to $10^{-3}$ second.

In various embodiments of the present invention, the laser system can be perform laser-based material processing for applications such as detecting, marking, engraving, micro-machining, cutting, microscopy, surgical operation, and the like.

In various embodiments of the present invention, the wavelength of the pump light may be in a range of 800 nm to 1000 nm.

In various embodiments of the present invention, the oscillator can further comprise a wavelength division multiplexer (WDM) connected to the pump light source and the cavity for guiding the pump light emitted from the pump light source into the cavity.

In various embodiments of the present invention, the pump light source may be a continuous wave (CW) semi-conductor laser, a fiber Bragg grating (FBG) stabilized semiconductor diode laser, an external cavity semiconductor diode laser, a compact solid-state laser or a fiber laser.

In various embodiments of the present invention, the cavity may be a linear cavity, a ring cavity, a non-linear cavity, a 8-shaped cavity or a 9-shaped cavity.

In various embodiments of the present invention, the cavity of the oscillator may be a ring fiber-based cavity, and the cavity can comprise a fiber cavity and a free space, and optical elements and/or at least one modulator can be disposed in the free space, so as to enhance the power and modulation of the outputted pulses In various embodiments of the present invention, the cavity can further comprise an optical amplifier for amplifying the laser light in the cavity. In alternative embodiments, the optical amplifier may be an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium, Erbium, Holmium, Praseodymium, Thulium, or Neodymium. For example. The optical fiber amplifier may be an ytterbium (Yb) doped fiber, an erbium (Er) doped fiber, a praseodymium (Pr) doped fiber, a thulium (Tm) doped fiber and a holmium (Ho) doped fiber. In one embodiment, the optical fiber amplifier may be an ytterbium (Yb) doped fiber.

In alternative embodiments, the optical amplifier may be a solid-state amplifier including, but not limited to, a solid-state rod amplifier, a solid-state disk amplifier or gaseous gain media.

In various embodiments of the present invention, the mode locked controller is disposed in the cavity, and the mode locked controller can be electrically connected to the control unit via a wire or wireless for receiving a control signal from the control unit.

In various embodiments of the present invention, the mode locked controller may be an electrical polarization controller or a polarization plate.

In various embodiments of the present invention, an isolator is disposed in the cavity for isolating the laser from proceeding along a former path. In one embodiment, the isolator is disposed between the collimator 116 and the mode locked controller.

In alternative embodiments, the isolator can be disposed in the fiber cavity or the free space according to a design of the isolator. That is, the isolator may be a fiber isolator or an isolator disposed in the free space.

In various embodiments of the present invention, at least one collimator is disposed in the cavity for collimating the laser. In alternative embodiments, two collimators can be disposed at both sides of the saturable absorber, respectively.

In various embodiments of the present invention, a saturable absorber in the cavity may be a ½ wave plate or a ¼ wave plate for varying the polarization direction of the laser light in the cavity, so as to act as the saturable absorber for mode locking in the laser system. In some embodiments, the saturable absorber may be a grapheme or a semiconductor saturable absorber mirror.

In various embodiments of the present invention, the free space can be formed between the two collimators, and there is no fiber disposed in free space, and the saturable absorber can be disposed in the free space formed between the two collimators. Therefore, the oscillator can have the fiber cavity and the optical resonance cavity for having the advantages thereof.

In various embodiments of the present invention, the laser output unit can comprise a beam-splitter and a compressor, and the beam-splitter is disposed downstream of the saturable absorber for guiding the laser pulses to the compressor, and the compressor is configured to compress the laser pulses for outputting.

In one embodiment, the beam-splitter may be a polarizing beam-splitter cube.

In one embodiment, the optical filter may be a band-pass filter disposed between the beam-splitter and the collimators configured to filter the laser of a specific wavelength, such as 1064 nm.

In one embodiment, the optical filter may be a fiber filter for being disposed in the fiber cavity.

In one embodiment, the optical filter may be a filter according to a wavelength and a transmittance of the laser for being disposed in the fiber free space.

In various embodiments of the present invention, the oscillator may further comprise at least one modulator for providing more modulations. According to embodiments of the present invention, the modulator can provide amplitude modulation and time-domain filtering of the seed signal as well as amplified spontaneous emission (ASE) filtering.

In one embodiment, the length of the optical pulse is determined by the operation of the modulator. In one embodiment, the modulator can provide the bandwidth necessary for generating short optical pulses. In some embodiments, the modulator may be a phase or frequency modulator with a suitable phase or frequency to amplitude converter, such as an edge optical filter, an extinction modulator, or an acousto-optic modulator.

In one embodiment, at least one modulator can be disposed between the two collimators and the saturable absorber, and/or disposed downstream of the output unit.

In one another embodiment, the modulator can be further disposed between the beam-splitter and the compressor.

In various embodiments of the present invention, the spectrum converter can comprise a focusing lens, a wavelength conversion chip, a collimating lens, and a plurality of filters. The focusing lens can be disposed at one side of the wavelength conversion chip for focusing the first laser pulses on the wavelength conversion chip, and the wavelength conversion chip is configured to perform the wavelength conversion, so as achieve the second laser pulses.

In one embodiment, the focusing lens may be a plano-convex lens.

In various embodiments of the present invention, the collimating lens of the spectrum converter can be disposed at another side of the wavelength conversion chip for collimating the second laser pulses from the wavelength conversion chip to the plurality of filters.

In various embodiments of the present invention, the plurality of filters of the spectrum converter can be disposed downstream of the collimating lens for filtering different wavelengths of the second laser pulses, thereby splitting the second laser pulses to output the laser pulses of multi-wavelengths.

In various embodiments of the present invention, the at least one photo-detector may be at least one photodiode In various embodiments of the present invention, the at least one photo-detector can be disposed in the spectrum converter for detecting a power of the second laser pulses.

In one embodiment, the number of the at least one photo-detector may be more than one, and the more than one photo-detectors can disposed at one side of the plurality of filter, and at least a portion of the second laser pulses from the filter can be guided to the photo-detectors by using beam-splitters.

In alternative embodiments, the wavelength conversion chip of the spectrum converter may have a non-linear crystal using a quasi-phase matched (QPM) method to achieve frequency conversion in pulse-wave and continue-wave as well as quasi-continue-wave. In one embodiment, the non-linear crystal of the wavelength conversion chip may have a periodically poled structure or an aperiodically poled structure, such as a periodically poled lithium niobate (PPLN) or an aperiodically poled lithium niobate (APPLN).

In alternative embodiments, a waveguide structure of the wavelength conversion chip may be a block waveguide structure, a planar waveguide structure or a channel waveguide structure.

In alternative embodiments, the wavelength conversion chip of the spectrum converter can convert a first wavelength of the laser pulses to a second wavelength, and the first wavelength is greater than 1000 nm, such as 1064 nm, and the second wavelength is less than 600 nm, such as 532 nm. In one embodiment, the second wavelength is less than 400 nm, such as 355 nm.

In alternative embodiments, when the power of the second laser pulses detected by the at least one photo-detector is lower than a threshold value, the control unit can transmit the control signal to the mode locked controller of the oscillator, so as to drive the mode locked controller to control or regulate the mode-locked status of the cavity of the oscillator.

In alternative embodiments, the threshold value may be greater than 80% of a normal value or an initial value of the power of the second laser pulses. In one embodiment, the threshold value may be 90% of the predetermined value.

In various embodiments of the present invention, according to an efficiency of the wavelength conversion chip, the control unit can determine whether to transmit the control signal to the mode locked controller of the oscillator, and the efficiency of the wavelength conversion chip can be determined according to the power of the second laser pulses detected by the at least one photo-detector.

In one embodiment, when the efficiency of the wavelength conversion chip is less or equal to 10%, the control unit can transmit the control signal to the mode locked controller of the oscillator, so as to drive the mode locked controller to control or regulate the mode-locked status of the cavity of the oscillator.

In one embodiment, the laser pulses outputted from the laser system can be amplified by an amplifier, and the amplifier can be disposed downstream of the laser system, such as disposed downstream of the spectrum converter.

In one embodiment, the spectrum converter can be disposed in the free space of the cavity, and thus the frequency conversion (or wavelength conversion) and mode locking can be achieved in the cavity.

In one embodiment, the spectrum converter and the modulator can be disposed between the at least one collimator and the laser output unit, and the at least one photo-detector can be disposed downstream of the laser output unit.

In one embodiment, the control unit may be a control chip integrated in the oscillator or the spectrum converter.

In comparison with the conventional laser system, the laser system of the present invention can actively and automatically regulate the mode-locked status of the cavity of the oscillator, so as to actively and automatically stabilize the laser pulses generated from the oscillator, thereby enhancing the performance of the outputted laser pulses of the laser system without manually maintaining or modulating the laser system.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

Figure 1:
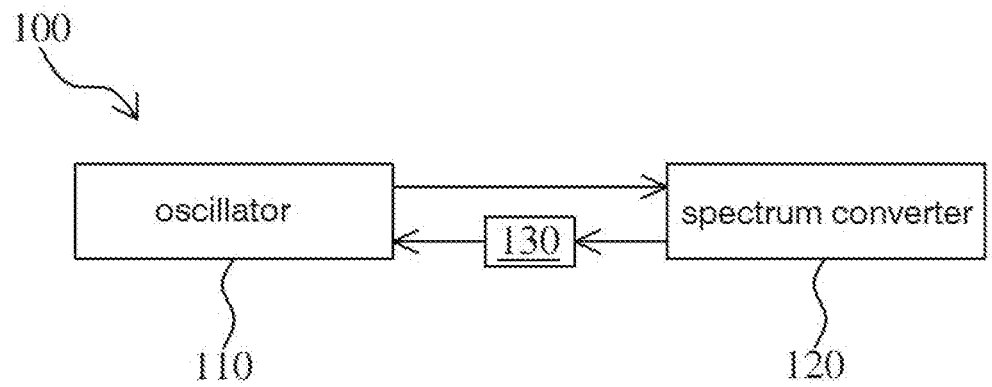
FIG. 1 is a block diagram showing a laser system according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings allow ease of understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It should be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top with respect to the direction of gravitational pull.

FIG. 1 is a block diagram showing a laser system according to one embodiment of the present invention. The laser system 100 of varied embodiments of the present invention can be used to generate laser pulses, such as femto-second laser, pico-second laser, micro-second laser, and the like. A pulse width of the laser pulses generated from the laser system 100 may be in a range of $10^{-15}$ second to $10^{-3}$ second. Depending on the application and the materials to be processed, the various characteristics of the laser pulses, including pulse width, pulse repetition rate, peak power or energy, and pulse shape, are selected as appropriate to the particular application. The laser system 100 of varied embodiments of the present invention can be perform laser-based material processing for applications such as detecting, marking, engraving, micro-machining, cutting, microscopy, surgical operation, and the like. The laser system 100 of the present invention can comprises an oscillator 110, a spectrum converter 120 and a control unit 130. The oscillator 110 is configured to generate first laser pulses, and the spectrum converter 120 is configured to modulate a frequency or a wavelength of the first laser pulses generated from the oscillator 110, so as to convert the first laser pulses into second laser pulses (the predetermined laser pulses). In laser system 100, a status of the second laser pulses can be timely detected, and the control unit 130 can control the oscillator 110 to modulate a mode-locked status of the oscillator 110, so as to actively and automatically stabilize the laser pulses generated from the oscillator 110, thereby enhancing the performance of the outputted laser pulses of the laser system 100 without manually maintaining or modulating the mode-locked status of the laser system.

Figure 2A:
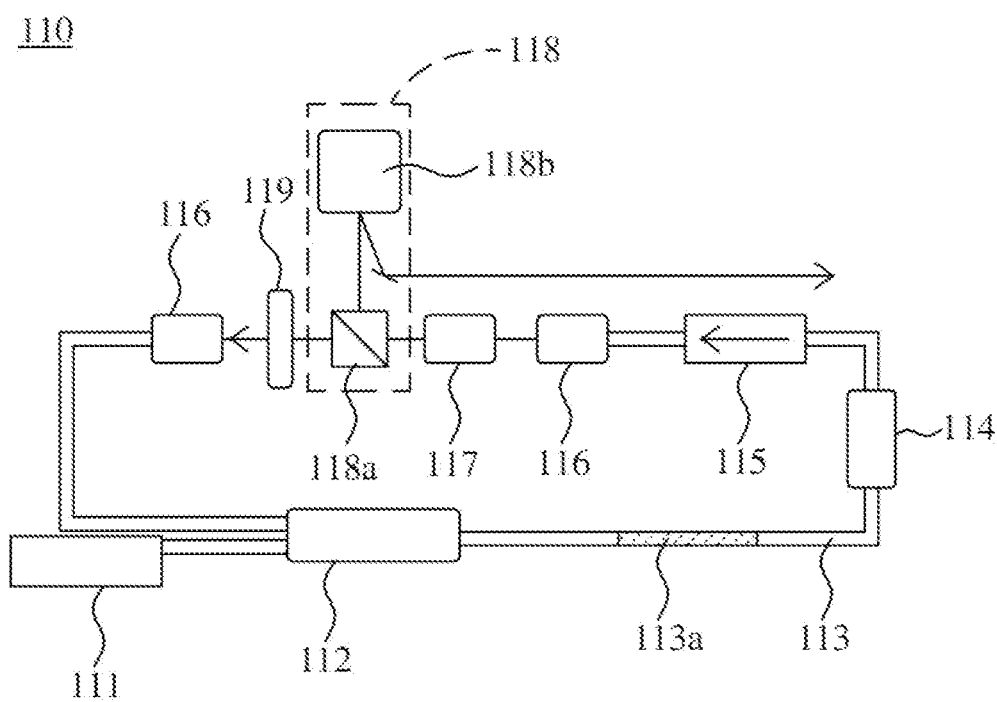
FIG. 2A is a schematic diagram showing the oscillator of the laser system according to one embodiment of the present invention.

FIG. 2A is a schematic diagram showing the oscillator of the laser system according to one embodiment of the present invention. In varied embodiments of the present invention, the oscillator 110 can comprise a pump light source 111, a wavelength division multiplexer (WDM) 112, a cavity 113, mode locked controller 114, an isolator 115, at least one collimator 116, a saturable absorber 117, a laser output unit 118 and an optical filter 119.

Referring to FIG. 2A again, in the oscillator 110, the pump light source 111 is configured to emit a pump light (or a seed signal) injected into the cavity 113. The pump light source 111 may be a continuous wave (CW) semiconductor laser. In a particular embodiment, the CW semiconductor laser may be a fiber Bragg grating (FBG) stabilized semiconductor diode laser. In another particular embodiment, the CW semiconductor laser may be an external cavity semiconductor diode laser. In alternative embodiments, the pump light or the seed signal may be generated by a compact solid-state laser or a fiber laser. One of ordinary skill in the art would recognize many variations, modifications, and alternatives. In varied embodiments, the wavelength of the pump light or the seed signal may be in a range of 800 nm to 1000 nm.

Referring to FIG. 2A again, in the oscillator 110, the WDM 112 is connected to the pump light source 111 and the cavity 113 for guiding the pump light emitted from the pump light source 111 into the cavity 113. The cavity 113 can be coupled to the pump light source 111 via the WDM 112, and the pump light can be resonated in the cavity 113 for forming a continuous wave laser. In varied embodiments, the cavity 113 may be a linear cavity, a ring cavity, a non-linear cavity, a 8-shaped cavity and a 9-shaped cavity. More specifically, the cavity 113 of the oscillator 110 may be a ring fiber-based cavity, and the cavity 113 can comprise fiber cavity and a free space, and optical elements and/or at least one modulator can be disposed in the free space, so as to enhance the power and modulation of the outputted pulses, thereby improving the power of the second laser pulses. The cavity 113 can further comprise an optical amplifier 113a for amplifying the laser light in the cavity 113. In alternative embodiments, the optical amplifier 113a may be an optical fiber amplifier. Fiber amplifiers utilized in embodiments of the present invention include, but are not limited to rare-earth-doped single-clad, double-clad, or even multiple-clad optical fibers. The rare-earth dopants used in such fiber amplifiers include Ytterbium, Erbium, Holmium, Praseodymium, Thulium, or Neodymium. For example. The optical fiber amplifier may be an ytterbium (Yb) doped fiber, an erbium (Er) doped fiber, a praseodymium (Pr) doped fiber, a thulium (Tm) doped fiber and a holmium (Ho) doped fiber. In the embodiment, the optical fiber amplifier may be an ytterbium (Yb) doped fiber.

In alternative embodiments, the optical amplifier 113a may be a solid-state amplifier including, but not limited to, a solid-state rod amplifier, a solid-state disk amplifier or gaseous gain media.

Referring to FIG. 2A again, in the oscillator 110, the mode locked controller 114 is disposed in the cavity 113, and the mode locked controller 114 can act as the saturable absorber for mode locking in the laser system. The mode locked controller 114 can be electrically connected to the control unit 130 via a wire or wireless for receiving a control signal from the control unit 130. In this manner, the control unit 130 can use the mode locked controller 114 in the cavity 113 to control the mode locked status of the oscillator 110. The mode locked controller 114 may be an electrical polarization controller or a polarization plate. In one embodiment, the mode locked controller 114 may be the electrical polarization controller for varying a polarization direction of the laser light in the cavity 113, so as to act as the saturable absorber for mode locking in the laser system. One of ordinary skill in the art would recognize that the mode locked controller 114 can have many variations, modifications, and alternatives.

Referring to 2A again, in the oscillator 110, the isolator 115 is disposed in the cavity 113 for isolating the laser from proceeding along a former path. In one embodiment, the isolator 115 is disposed between the collimator 116 and the mode locked controller 114.

In alternative embodiments, the isolator 115 is disposed in the cavity 113 of the oscillator 110. In one embodiment, the cavity 113 can comprise the fiber cavity and the free space, and thus the isolator 115 can be disposed in the fiber cavity or the free space according to a design of the isolator. That is, the isolator 115 may be a fiber isolator or an isolator disposed in the free space.

Referring to 2A again, in the oscillator 110, the collimator 116 is disposed in the cavity 113 for collimating the laser. In alternative embodiments, two collimators 116 can be disposed at both sides of the saturable absorber 117, respectively. In one embodiment, the saturable absorber 117 may be a ½ wave plate or a ¼ wave plate for varying the polarization direction of the laser light in the cavity 113, so as to act as the saturable absorber for mode locking in the laser system. One of ordinary skill in the art would recognize that the saturable absorber 117 can have many variations, modifications, and alternatives.

In some embodiments, the saturable absorber 117 may be a grapheme or a semiconductor saturable absorber mirror.

Referring to 2A again, in one embodiment, the free space can be formed between the two collimators 116, and there is no fiber disposed in free space, and the saturable absorber 117 can be disposed in the free space formed between the two collimators 116. Therefore, the oscillator 110 can have the fiber cavity and the optical resonance cavity for having the advantages thereof.

Referring to 2A again, in the oscillator 110, the laser output unit 118 is configured to output the laser pulses from the saturable absorber 117. The laser output unit 118 can comprise a beam-splitter 118a and a compressor 118b, and the beam-splitter 118a is disposed downstream of the saturable absorber 117 for guiding the laser pulses to the compressor 118b, and the compressor 118b is configured to compress the laser pulses for outputting. In one embodiment, the beam-splitter 118a may be a polarizing beam-splitter cube. The optical filter 119 is configured to filter the laser of a specific wavelength, such as 1064 nm. In one embodiment, the optical filter 119 may be band-pass filter disposed between the beam-splitter 118a and the collimators 116.

In the embodiments of the present invention, the optical filter 119 can be disposed in the cavity 113 of the oscillator 110, and the cavity 113 can comprise the fiber and the free space, and thus the optical filter 119 may be a fiber filter for being disposed in the fiber, or a filter according to a wavelength and a transmittance of the laser for being disposed in the fiber free space.

Figure 2B:
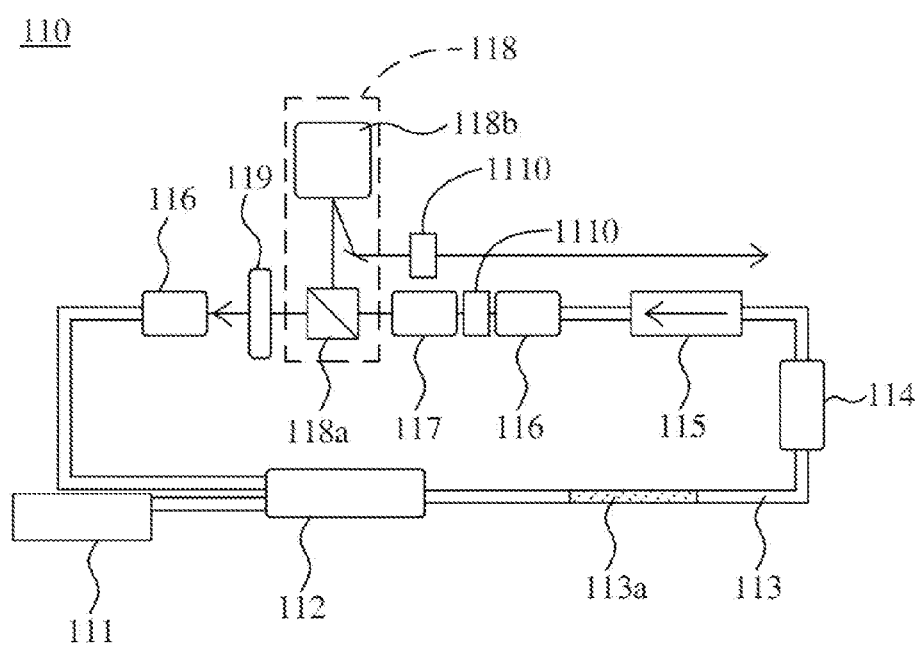
FIG. 2B is a schematic diagram showing the oscillator of the laser system according to another embodiment of the present invention.

FIG. 2B is a schematic diagram showing the oscillator of the laser system according to another embodiment of the present invention. In another embodiment, the oscillator 110 may further comprise at least one modulator 1110 for providing more modulations. According to embodiments of the present invention, the modulator 1110 can provide amplitude modulation and time-domain filtering of the seed signal as well as amplified spontaneous emission (ASE) filtering. In one embodiment, the length of the optical pulse is determined by the operation of the modulator 1110. In one embodiment, the modulator 1110 can provide the bandwidth necessary for generating short optical pulses. In some embodiments, the modulator 1110 may be a phase or frequency modulator with a suitable phase or frequency to amplitude converter, such as an edge optical filter, an extinction modulator, or an acousto-optic modulator. For example, an electro-optic phase modulator can induce a frequency chirp to the optical signal, which would be converted into an amplitude modulation when the optical signal is transmitted through a short or long pass optical filter. In one embodiment, the optical signal would be characterized by a wavelength that experiences high loss when no electrical signal is applied to the electro-optic phase modulator. When an electrical signal is applied to the electro-optic phase modulator, the optical signal can experience a change in wavelength or frequency chirp to a value characterized by low optical loss. In one embodiment, specifically, the modulator 1110 can be disposed between the collimators 116 and the saturable absorber 117, and/or disposed downstream of the output unit 118.

Figure 2C:
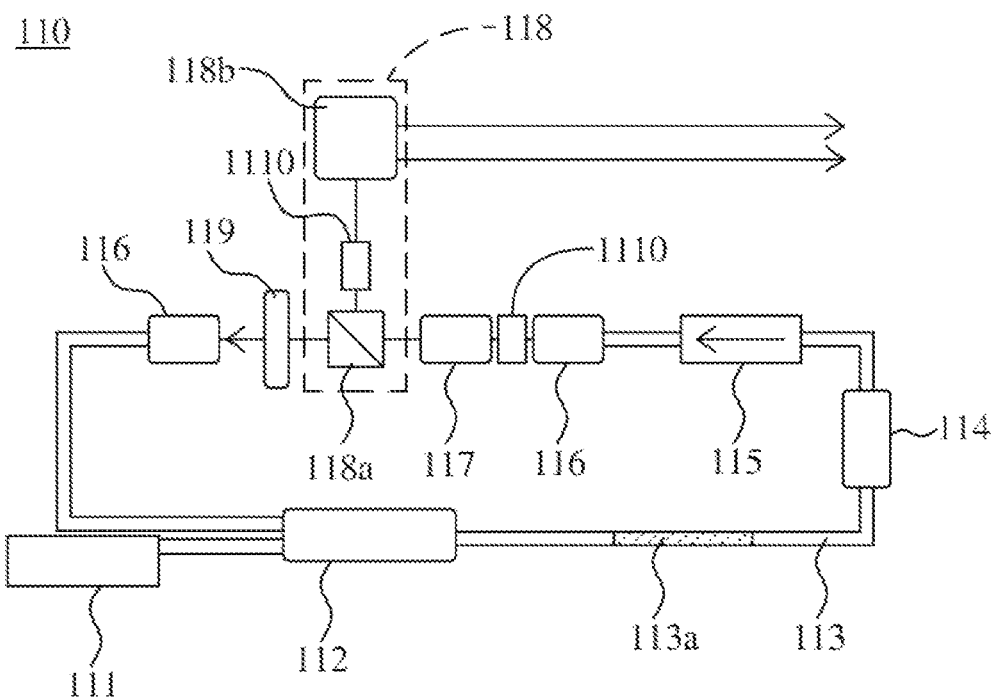
FIG. 2C is a schematic diagram showing the oscillator of the laser system according to one another embodiment of the present invention.

FIG. 2C is a schematic diagram showing the oscillator of the laser system according to one another embodiment of the present invention. In one another embodiment, the modulator 1110 can be further disposed between the beam-splitter 118*a* and the compressor 118*b*.

Figure 3:
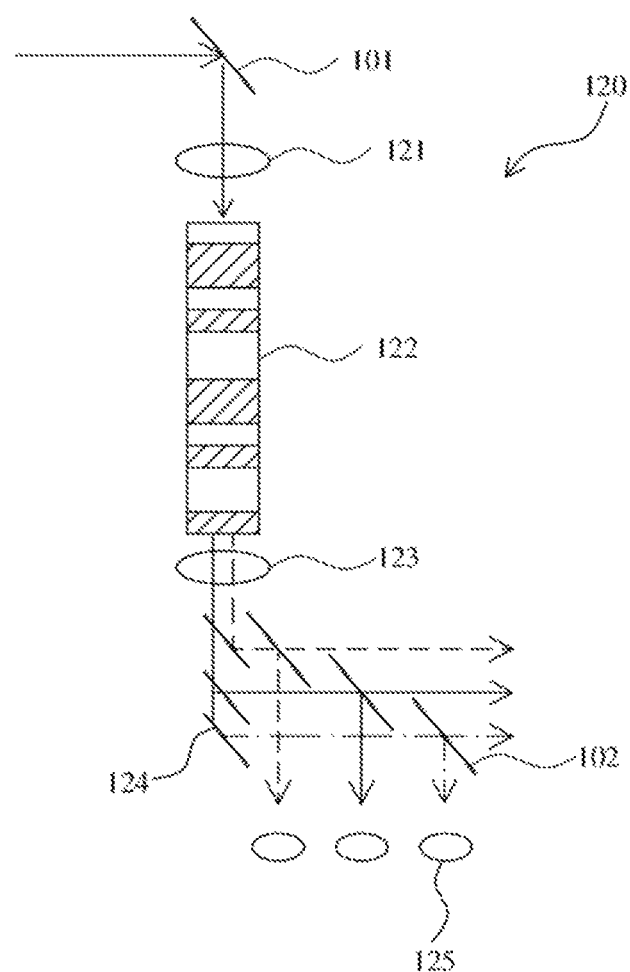
FIG. 3 is a schematic diagram showing the spectrum converter of the laser system according to one embodiment of the present invention.

FIG. 3 is a schematic diagram showing the spectrum converter of the laser system according to one embodiment of the present invention. In varied embodiments of the present invention, the first laser pulses generated from the oscillator 110 can be inputted into the spectrum converter 120 for varying the wavelength of the first laser pulses, so as to convert the first laser pulses from the oscillator 110 into the second laser pulses (the predetermined laser pulses). In one embodiment, the compressed first laser pulses can be reflected to the spectrum converter 120 by the reflecting mirror 101. The spectrum converter 120 can comprise a focusing lens 121, a wavelength conversion chip 122, a collimating lens 123, a plurality of filter 124 and at least one photo-detector 125. The focusing lens 121 can be disposed at one side of the wavelength conversion chip 122 for focusing the first laser pulses on the wavelength conversion chip 122, and the wavelength conversion chip 122 is configured to perform the wavelength conversion, so as achieve the second laser pulses. In one embodiment, the focusing lens 121 may be a plano-convex lens. The collimating lens 123 can be disposed at another side of the wavelength conversion chip 122 for collimating the second laser pulses from the wavelength conversion chip 122. The plurality of filter 124 can be disposed downstream of the collimating lens 123 for filtering different wavelengths of the second laser pulses, thereby splitting the second laser pulses to output the laser pulses of multi-wavelengths. The at least one photo-detector 125 may be at least one photodiode, and the at least one photo-detector 125 can be disposed in the spectrum converter 120 for detecting a power of the second laser pulses. In one embodiment, the number of the at least one photo-detector 125 may be more than one, and the more than one photo-detectors 125 can disposed at one side of the plurality of filter 124, and at least a portion of the second laser pulses from the filter 124 can be guided to the photo-detectors 125 by using beam-splitters 102. When the power of the second laser pulses is detected by the at least one photo-detector 125, the at least one photo-detector 125 can timely or regularly transmit a detection signal to the control unit 130, so as to provide the power of the second laser pulses for the control unit 130.

Figure 4A:
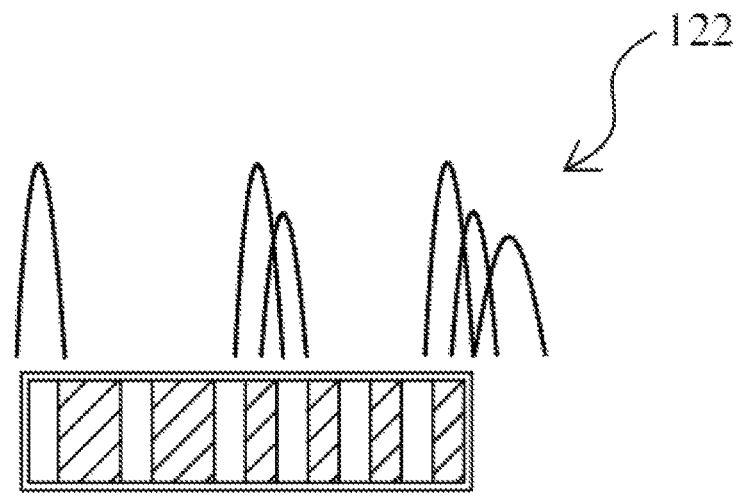
FIGS. 4A and 4B are schematic diagrams showing a non-linear crystal of the wavelength conversion chip according to one embodiment of the present invention.
Figure 4B:
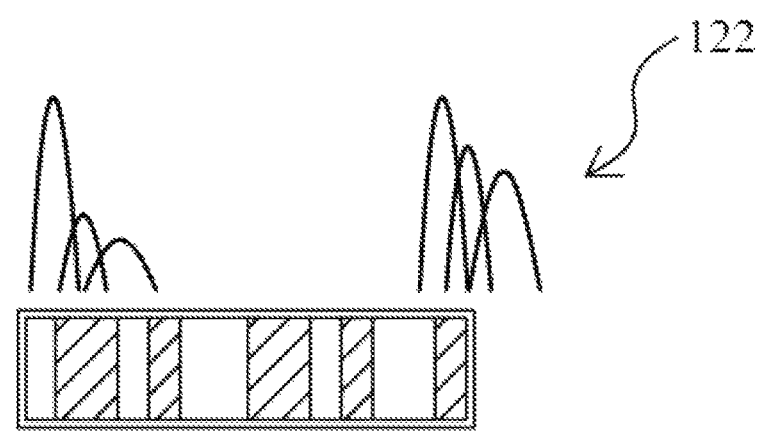

FIGS. 4A and 4B are schematic diagrams showing a non-linear crystal of the wavelength conversion chip according to one embodiment of the present invention. In alternative embodiments, the wavelength conversion chip 122 may have a non-linear crystal using a quasi-phase matched (QPM) method to achieve frequency conversion in pulse-wave and continue-wave as well as quasi-continue-wave. More specifically, in one embodiment, the non-linear crystal of the wavelength conversion chip 122 may have a periodically poled structure (as shown in FIG. 4A) or an aperiodically poled structure (as shown in FIG. 4B), such as a periodically poled lithium niobate (PPLN) or an aperiodically poled lithium niobate (APPLN).

Figure 5A:
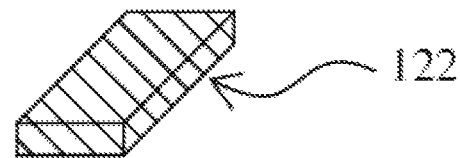
FIGS. 5A, 5B and 5C are schematic diagrams showing a waveguide structure of the wavelength conversion chip according to one embodiment of the present invention.
Figure 5B:
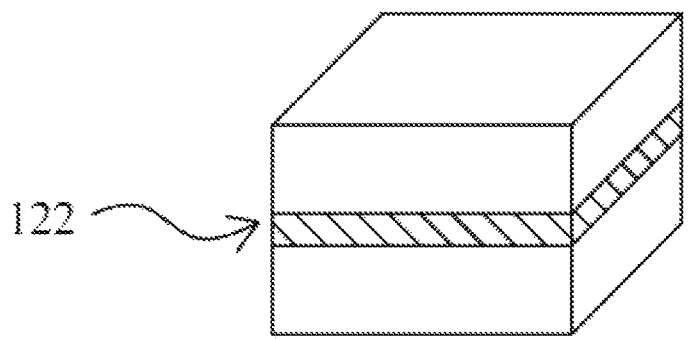
Figure 5C:
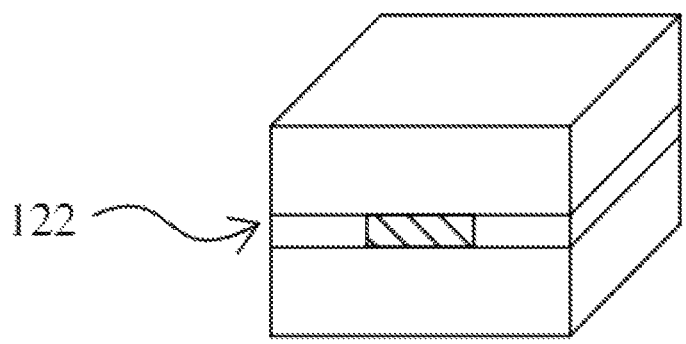

FIGS. 5A, 5B and 5C are schematic diagrams showing a waveguide structure of the wavelength conversion chip according to one embodiment of the present invention. More specifically, in alternative embodiments, a waveguide structure of the wavelength conversion chip 122 may be a block waveguide structure (as shown in FIG. 5A), a planar waveguide structure (as shown in FIG. 5B) or a channel waveguide structure (as shown in FIG. 5C).

In alternative embodiments, the wavelength conversion chip 122 can convert a first wavelength of the laser pulses to a second wavelength, and the first wavelength is greater than 1000 nm, such as 1064 nm, and the second wavelength is less than 600 nm, such as 532 nm. In one embodiment, the second wavelength is less than 400 nm, such as 355 nm.

In alternative embodiments, according to the detected power of the second laser pulses by the at least one photo-detector 125, the control unit 130 can timely or regularly control or regulate the mode-locked status of the cavity of the oscillator 110, so as to actively and automatically stabilize the laser pulses generated from the oscillator 110, thereby enhancing the performance of the outputted laser pulses of the laser system 100 without manually maintaining or modulating the mode-locked status of the laser system. In one embodiment, more specifically, the at least one photo-detector 125 can be disposed in the spectrum converter 120, and the control unit 130 can control or regulate the mode-locked status of the cavity of the oscillator 110 according to the power of the second laser pulses detected by the at least one photo-detector 125. When the power of the second laser pulses detected by the at least one photo-detector 125 is lower than a threshold value, the control unit 130 can transmit the control signal to the mode locked controller 114 of the oscillator 110, so as to drive the mode locked controller 114 to control or regulate the mode-locked status of the cavity 113 of the oscillator 110.

In alternative embodiments, the threshold value may be greater than 80% of a normal value or an initial value of the power of the second laser pulses. In one embodiment, the threshold value may be 90% of the predetermined value.

In one embodiment, according to an efficiency of the wavelength conversion chip 122, the control unit 130 can determine whether to transmit the control signal to the mode locked controller 114 of the oscillator 110. For example, the efficiency of the wavelength conversion chip 122 can be determined according to the power of the second laser pulses detected by the at least one photo-detector 125. In this case, when the efficiency of the wavelength conversion chip 122 is less or equal to 10%, the control unit 130 can transmit the control signal to the mode locked controller 114 of the oscillator 110, so as to drive the mode locked controller 114 to control or regulate the mode-locked status of the cavity 113 of the oscillator 110.

In one embodiment, the laser pulses outputted from the laser system 100 can be amplified by an amplifier (not shown), and the amplifier can be disposed downstream of the laser system 100, such as disposed downstream of the spectrum converter 120.

Figure 6:
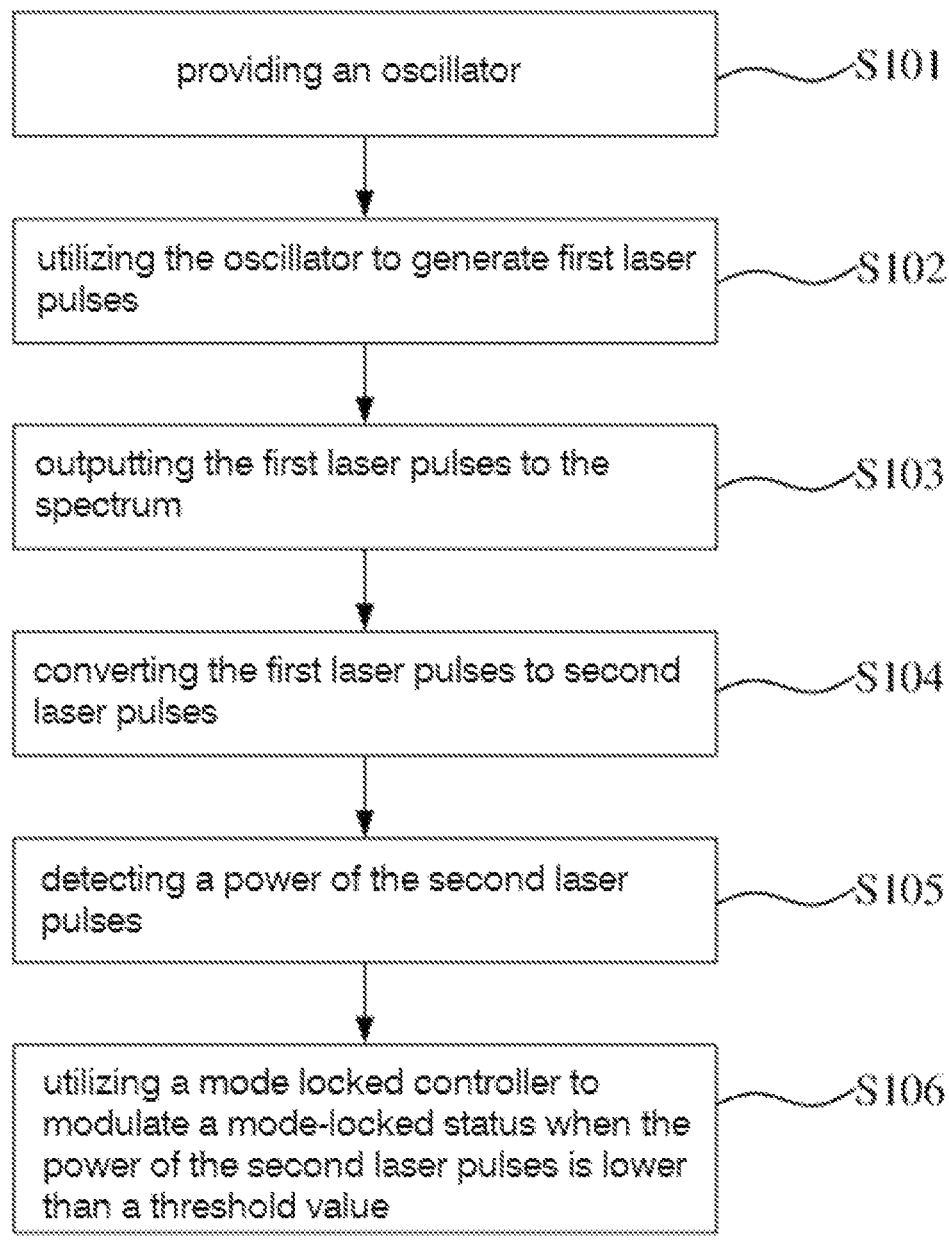
FIG. 6 is a flowchart of a laser outputting method according to varied embodiments of the present invention.

FIG. 6 is a flowchart of a laser outputting method according to varied embodiments of the present invention. In order to assist in the explanation of the laser outputting method, it will be assumed that the method can be performed using the control unit 130. Furthermore, the following discussion of method will lead to a further understanding of the control unit 130 or other computing devices and its various components. However, it is to be understood that the control unit 130 and/or the laser outputting method can be varied, and need not work exactly as discussed herein in conjunction with each other, and that such variations are within the scope of present implementations.

It is to be emphasized, however, that the laser outputting method need not be performed in the exact sequence as shown, unless otherwise indicated; and likewise various blocks may be performed in parallel rather than in sequence; hence the elements of the method are referred to herein as "blocks" rather than "steps". It is also to be understood that method can be implemented on variations of computing device as well.

It is further appreciated the laser outputting method can be implemented in system 100. Referring to FIG. 6 again, when using the laser system 100 to output the laser pulses, the oscillator 110 of the laser system 100 is provided, and the pump light source 111 of the oscillator 110 is utilized to emit a pump light to the cavity 113 (at block S101), and the oscillator 110 is utilized to generate the first laser pulses (at block S102), and the first laser pulses are outputted to the spectrum converter 120 from the oscillator 110 (at block S103), and the wavelength conversion chip 122 of the spectrum converter 120 is utilized to convert the first laser pulses to the second laser pulses (at block S104), and the at least one photo-detector 125 is utilized to detect the power of the second laser pulses (at block S105), and the control unit 130 can utilize the mode locked controller 114 to modulate the mode-locked status of the cavity 113 of the oscillator 110 when the power of the second laser pulses is lower than a threshold value (at block S106).

Figure 7:
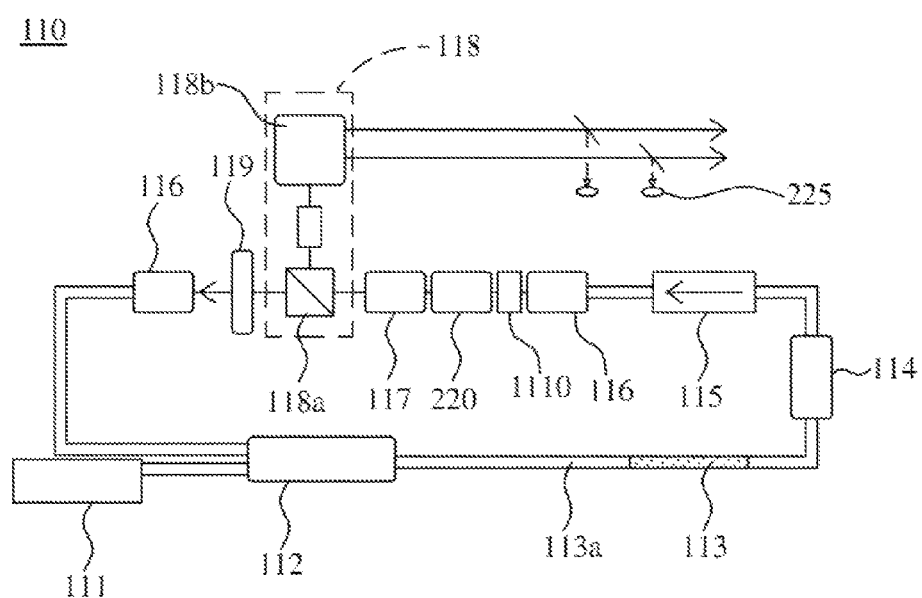
FIG. 7 is a schematic diagram showing a laser system according to one embodiment of the present invention.

FIG. 7 is a schematic diagram showing a laser system according to one embodiment of the present invention. In one embodiment, as shown in FIG. 7, the spectrum converter 220 can be disposed in the free space of the cavity 113. In this case, the frequency conversion (or wavelength conversion) and mode locking can be achieved in the cavity 113. Since the power of the laser in the cavity 113 is higher than the power of the laser outputted from the oscillator 110, the frequency conversion (or wavelength conversion) in the cavity 113 can be have a higher conversion efficiency. More specifically, the spectrum converter 220 and the modulator 1110 can be disposed between the at least one collimator 116 and the laser output unit 118, and the at least one photo-detector 225 is disposed downstream of the laser output unit 118. In this case, the spectrum converter 220 can convert the first laser pulses to the second laser pulses, and the at least one photo-detector 225 disposed downstream of the laser output unit 118 can detect the power of the second laser pulses, and the control unit 130 can utilize the mode locked controller 114 to regulate the mode-locked status of the cavity 113 when the power of the second laser pulses is lower than a threshold value.

Therefore, according the outputted laser, the laser system 100 of the present invention can actively and automatically regulate the mode-locked status of the cavity of the oscillator 110, so as to actively and automatically stabilize the laser pulses generated from the oscillator 110, thereby enhancing the performance of the outputted laser pulses of the laser system 100 without manually maintaining or modulating the laser system.

In embodiments of the present invention, the control unit 130 may be provided as a computer program product, or software, that may include a machine-readable medium having stored thereon instructions, which may be used to program a computer system (or other electronic devices) to perform a process according to embodiments of the present invention. In one embodiment, the control unit 130 may be coupled with the oscillator 110 and the spectrum converter 120 (or spectrum converter 220). A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc. However, the control unit 130 is not limited to this. In one embodiment, the control unit 130 may be a control chip integrated in the oscillator or the spectrum converter.

In embodiments of the present invention, a set of instructions in the control unit 130, for causing the machine to perform any one or more of the methodologies described herein, may be executed. In alternative embodiments, the machine of the control unit 130 may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary control unit 130 may includes a processor, a main memory (e.g., read-only memory (ROM), flash memory, dynamic random access memory (DRAM) such as synchronous DRAM (SDRAM) or Rambus DRAM (RDRAM), etc.), a static memory (e.g., flash memory, static random access memory (SRAM), etc.), and a secondary memory (e.g., a data storage device), which communicate with each other via a bus.

The processor of the control unit 130 can represent one or more general-purpose processing devices such as a microprocessor, central processing unit, or the like. More particularly, the processor may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor may also be one or more special-purpose processing devices such as an application specific integrated circuit (ASIC), a field programmable gate array (FPGA), a digital signal processor (DSP), network processor, or the like. Processor is configured to execute the processing logic for performing the operations described herein.

The control unit 130 may further include a network interface device. The c control unit 130 also may include a video display unit (e.g., a liquid crystal display (LCD), a light emitting diode display (LED), or a cathode ray tube (CRT)), an alphanumeric input device (e.g., a keyboard), a cursor control device (e.g., a mouse), and a signal generation device (e.g., a speaker).

The secondary memory of the control unit 130 may include a machine-accessible storage medium (or more specifically a computer-readable storage medium) on which is stored one or more sets of instructions (e.g., software) embodying any one or more of the methodologies or functions described herein. The software may also reside, completely or at least partially, within the main memory and/or within the processor during execution thereof by the control unit 130, the main memory and the processor also constituting machine-readable storage media. The software may further be transmitted or received over a network via the network interface device.

While the machine-accessible storage medium of the control unit 130 in an exemplary embodiment is a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

The term "lens", where the context allows, may refer to any one of various types of optical components, including refractive, diffractive, reflective, magnetic, electromagnetic and electrostatic optical components or combinations thereof.

Various aspects of the illustrative implementations are described herein using terms commonly employed by those skilled in the art to convey the substance of their work to others skilled in the art. It will be apparent to those skilled in the art, however, that embodiments of the present invention may be practiced with only some of the described aspects. For purposes of explanation, specific numbers, materials and configurations are set forth in order to provide a thorough understanding of the illustrative implementations. It will be apparent to one skilled in the art, however, that embodiments of the present invention may be practiced without the specific details. In other instances, well-known features are omitted or simplified in order not to obscure the illustrative implementations.

Flow diagrams illustrated herein provide examples of sequences of various process actions which may be performed by processing logic that may include hardware, software, or a combination thereof. Furthermore, various operations are described as multiple discrete operations, in turn, in a manner that is most helpful in understanding the illustrative embodiments; however, the order of description should not be construed as to imply that these operations are necessarily order dependent. Thus, the illustrated implementations should be understood only as examples, and the processes can be performed in a different order, and some actions may be performed in parallel, unless otherwise specified.

Moreover, methods within the scope of this disclosure may include more or fewer steps than those described.

The phrases "in some embodiments" and "in various embodiments" are used repeatedly. These phrases generally do not refer to the same embodiments; however, they may. The terms "comprising", "having", and "including" are synonymous, unless the context dictates otherwise.

Although various example methods, apparatuses, and systems have been described herein, the scope of coverage of the present disclosure is not limited thereto. On the contrary, the present disclosure covers all methods, apparatus, systems, and articles of manufacture fairly falling within the scope of the appended claims, which are to be construed in accordance with established doctrines of claim interpretation. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

The present invention has been described with preferred embodiments thereof, and it is understood that many changes and modifications to the described embodiments can be carried out without departing from the scope and the spirit of the invention that is intended to be limited only by the appended claims.

The invention claimed is:

1. A laser system, comprising:
   an oscillator, comprising:
      a pump light source;
      a cavity connected to the pump light source;
      a mode locked controller disposed in the cavity;
      two collimators disposed in the cavity;
      a saturable absorber disposed in the cavity, wherein the two collimators are disposed at both sides of the saturable absorber, and a free space is formed between the two collimators; and
      a laser output unit configured to output first laser pulses;
   a spectrum converter, comprising:
      a wavelength conversion chip configured to convert the first laser pulses into second laser pulses;
      a plurality of filters configured to filter different wavelengths of the second laser pulses, so as to split the second laser pulses for outputting the second laser pulses of multi-wavelengths; and
      a plurality of photo-detector corresponding to the plurality of filters and configured to detect a power of the second laser pulses; and
   a control unit electrically connected to the mode locked controller, wherein, when the power of the second laser pulses is lower than a threshold value, the control unit transmits a control signal to the mode locked controller, so as to drive the mode locked controller to control a mode-locked status of the cavity of the oscillator.

2. A laser system, comprising:
   an oscillator, comprising:
      a pump light source;
      a cavity connected to the pump light source;
      a mode locked controller disposed in the cavity; and
      a laser output unit configured to output first laser pulses;
   a spectrum converter, comprising:
      a wavelength conversion chip configured to convert the first laser pulses into second laser pulses; and
   at least one photo-detector configured to detect a power of the second laser pulses, wherein, when the power of the second laser pulses is lower than a threshold value, a control signal is transmitted to the mode locked controller, so as to drive the mode locked controller to control a mode-locked status of the cavity of the oscillator.

3. The laser system according to claim 2, wherein the oscillator further comprises a wavelength division multiplexer (WDM) connected to the pump light source and the cavity, so as to guide a pump light emitted from the pump light source into the cavity.

4. The laser system according to claim 2, wherein the cavity is a linear cavity, a ring cavity, a non-linear cavity, a 8-shaped cavity or a 9-shaped cavity.

5. The laser system according to claim 2, wherein the cavity of the oscillator is a ring fiber-based cavity, and the cavity comprises a fiber cavity and a free space, and at least one optical element and/or at least one modulator is disposed in the free space.

6. The laser system according to claim 2, wherein the mode locked controller is disposed in the cavity, and the mode locked controller is electrically connected to a control unit for receiving a control signal from the control unit.

7. The laser system according to claim 2, wherein the oscillator further comprises two collimators and a saturable absorber disposed in the cavity, and the two collimators are disposed at both sides of the saturable absorber, respectively.

8. The laser system according to claim 7, wherein a free space is formed between the two collimators.

9. The laser system according to claim 7, wherein at least one modulator is disposed between the two collimators and the saturable absorber.

10. The laser system according to claim 2, wherein the laser output unit comprises a beam-splitter and a compressor, and the beam-splitter is configured to guide the first laser pulses to the compressor, and the compressor is configured to compress the first laser pulses for outputting.

11. The laser system according to claim 2, wherein the spectrum converter further comprises a plurality of filters, and the plurality of filters are configured to filter different wavelengths of the second laser pulses, so as to split the second laser pulses for outputting the second laser pulses of multi-wavelengths.

12. The laser system according to claim 11, wherein the number of the at least one photo-detector is more than one, and the more than one photo-detectors are disposed at one side of the plurality of filter, and at least a portion of the second laser pulses from the filters is guided to the photo-detectors by using beam-splitters.

13. The laser system according to claim 2, wherein the spectrum converter further comprises a focusing lens and a collimating lens, the focusing lens is disposed at one side of the wavelength conversion chip for focusing the first laser pulses on the wavelength conversion chip, and the collimating lens of the spectrum converter is disposed at another side of the wavelength conversion chip for collimating the second laser pulses from the wavelength conversion chip.

14. The laser system according to claim 2, wherein the at least one photo-detector is disposed in the spectrum converter for detecting a power of the second laser pulses.

15. The laser system according to claim 2, wherein the threshold value is greater than 80% of a normal value of the power of the second laser pulses.

16. The laser system according to claim 2, wherein the wavelength conversion chip of the spectrum converter is configured to convert a first wavelength of the first laser pulses to a second wavelength, and the first wavelength is greater than 1000 nm, and the second wavelength is less than 600 nm. In one embodiment, the second wavelength is less than 400 nm, such as 355 nm.

17. The laser system according to claim 2, wherein, according to an efficiency of the wavelength conversion chip, a control unit determines whether to transmit the control signal to the mode locked controller of the oscillator, and the efficiency of the wavelength conversion chip is determined according to the power of the second laser pulses detected by the at least one photo-detector.

18. The laser system according to claim 17, wherein, when the efficiency of the wavelength conversion chip is less or equal to 10%, the control unit transmits the control signal to the mode locked controller of the oscillator.

19. The laser system according to claim 2, wherein the spectrum converter is disposed in a free space of the cavity, and the at least one photo-detector is disposed downstream of the laser output unit.

20. A laser outputting method, comprising:
   providing an oscillator, wherein the oscillator comprises a pump light source, a cavity and a mode locked controller;
   utilizing the pump light source to emit a pump light into the cavity;
   utilizing the oscillator to generate first laser pulses;
   outputting the first laser pulses to a spectrum converter, wherein the spectrum converter comprises a wavelength conversion chip;
   utilizing the wavelength conversion chip to convert the first laser pulses to second laser pulses;
   utilizing at least one photo-detector to detect a power of the second laser pulses; and
   controlling the mode locked controller to modulate a mode-locked status of the cavity when the power of the second laser pulses is lower than a threshold value.

* * * * *